United States Patent
Yamanaka et al.

(10) Patent No.: US 9,156,985 B2
(45) Date of Patent: Oct. 13, 2015

(54) FLUORORUBBER COMPOSITION

(75) Inventors: Takuya Yamanaka, Tokyo (JP); Kenichi Uchida, Kanagawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 14/110,224

(22) PCT Filed: Apr. 2, 2012

(86) PCT No.: PCT/JP2012/058902
§ 371 (c)(1),
(2), (4) Date: Oct. 7, 2013

(87) PCT Pub. No.: WO2012/137724
PCT Pub. Date: Oct. 11, 2012

(65) Prior Publication Data
US 2014/0031461 A1   Jan. 30, 2014

(30) Foreign Application Priority Data
Apr. 6, 2011   (JP) ................. 2011-084535

(51) Int. Cl.
| | |
|---|---|
| *C08L 95/00* | (2006.01) |
| *C09K 3/10* | (2006.01) |
| *C08L 27/12* | (2006.01) |
| *C08L 27/18* | (2006.01) |
| *C08K 3/04* | (2006.01) |
| *C08K 3/34* | (2006.01) |

(52) U.S. Cl.
CPC . *C08L 95/00* (2013.01); *C08K 3/04* (2013.01); *C08K 3/34* (2013.01); *C08K 3/346* (2013.01); *C08L 27/12* (2013.01); *C08L 27/18* (2013.01); *C09K 3/1009* (2013.01)

(58) Field of Classification Search
CPC ......... C08L 27/16; C08L 27/18; C08L 27/20; C08K 3/04; C08K 3/346; C08K 3/34; C08K 2201/014; C08K 2201/019
USPC ............ 524/545, 546, 424, 451, 442, 63, 496
See application file for complete search history.

(56) References Cited

U.S. PATENT DOCUMENTS

| | | | |
|---|---|---|---|
| 4,696,989 A * | 9/1987 | Oka et al. ............. | 526/254 |
| 2006/0041069 A1* | 2/2006 | Sumi et al. ........... | 525/192 |
| 2010/0036039 A1* | 2/2010 | Sano .................... | 524/451 |
| 2010/0068436 A1* | 3/2010 | Shimizu et al. ....... | 428/36.91 |
| 2011/0009568 A1* | 1/2011 | Okazaki et al. ........ | 525/326.3 |
| 2011/0172338 A1* | 7/2011 | Murakami et al. ...... | 524/377 |

FOREIGN PATENT DOCUMENTS

| | | |
|---|---|---|
| JP | 05-287150 | 11/1993 |
| JP | 10-139970 | 5/1998 |
| JP | 2001-192482 | 7/2001 |
| JP | 2004-217892 | 8/2004 |
| JP | 2006-299224 | 11/2006 |
| JP | 2006299224 A * | 11/2006 |
| JP | 2010-523764 | 7/2010 |
| JP | 4539510 | 7/2010 |
| WO | WO 2006/011547 A1 | 2/2006 |
| WO | WO 2008/038555 A1 | 4/2008 |
| WO | WO 2008-124260 A1 | 10/2008 |

OTHER PUBLICATIONS

English Translation of JP 2006-299224; Kawasaki et al; Nov. 2006.*
International Search Report based on corresponding PCT application No. PCT/JP2012/058902 dated Apr. 24, 2012(4 pgs).

* cited by examiner

Primary Examiner — Karuna P Reddy
(74) Attorney, Agent, or Firm — Brinks Gilson & Lione

(57) ABSTRACT

A fluororubber composition comprising 100 parts by weight of a peroxide-crosslinkable tetrafluoroethylene-vinylidene fluoride-hexafluoropropene ternary copolymer rubber having a fluorine content of 64 wt. % or more, (A) 5 to 90 parts by weight of carbon black having a specific surface area of 5 to 20 $m^2/g$, (B) 5 to 40 parts by weight of a fine bituminous powder, (C) at least one of 1 to 20 parts by weight of hydrophilicity-imparted talc and/or 1 to 30 parts by weight of hydrophilicity-imparted clay, and (D) 0.5 to 6 parts by weight of an organic peroxide; the fluororubber composition being used as a molding material for fuel oil sealing materials to be in contact with fuel oil. The fluororubber composition provides a sealing materials having excellent metal corrosion resistance, without compounding an acid acceptor comprising a metal oxide.

9 Claims, No Drawings

FLUORORUBBER COMPOSITION

RELATED APPLICATION

This application is a 35 U.S.C. §371 national phase filing of International Patent Application No. PCT/JP2012/058902, filed Apr. 2, 2012, through which and to which priority is claimed under 35 U.S.C. §119 to Japanese Patent Application No.2011-084535, filed Apr. 6, 2011.

TECHNICAL FIELD

The present invention relates to a fluororubber composition. More particularly, the present invention relates to a fluororubber composition having excellent metal corrosion resistance.

BACKGROUND ART

Conventional general-purpose fluororubber has very excellent resistance as oil sealing materials for engine oil, fuel oil, etc., but is not suitable as water sealing materials for cooling water, LLC (long life coolant), etc. For sealing materials for cooling devices, such as cylinder liners, oil coolers, and radiators, silicone rubber, EPDM, or a specific grade of fluororubber is generally used.

However, silicone rubber has problems, such as lack of hardness and inferior hydrolysis resistance. Moreover, as for EPDM, degradation of the rubber may occur because of hypochlorous acid derived from chlorine, which is generally added to tap water. This causes black water phenomena, in which black foreign substances are mixed into water, and peripheral equipment is contaminated. Furthermore, tap water contains many ionic substances, other than hypochlorous acid, and such various ions lead to degradation of the rubber when the rubber is used for application in direct contact with tap water. In addition, similar problems occur when EPDM is used for transport and storage of solutions containing these various ions.

A specific grade of fluororubber is superior in hot water resistance and steam resistance compared to general-purpose fluororubber, but is problematically inferior in low-temperature characteristics and durability (indicated by the rate of change of compression set values). Moreover, perfluoropolyether type fluororubber (e.g., Kalrez, produced by DuPont·Dow Elastomers) has extremely excellent heat resistance, but has very poor compression set characteristics. Furthermore, their price is very expensive. Accordingly, such fluororubber is less suitable for molding materials for general-purpose sealing materials.

In contrast, products obtained by polyol vulcanization of binary type fluororubber (e.g., vinylidene fluoride-hexafluoropropene binary copolymer rubber) are superior in compression set characteristics but inferior in chemical stability. Thus, they have possible defects, such as cleavage of crosslinking sites caused by hydrolysis, against hot water and steam. Moreover, products obtained by polyol vulcanization of ternary type fluororubber (e.g., tetrafluoroethylene-vinylidene fluoride-hexafluoropropene ternary copolymer rubber) have higher fuel oil resistance than binary type fluororubber, but tends to have lower compression set characteristics. Furthermore, as for products obtained by amine vulcanization, the rubber is eroded by amine contained in fuel oil, sometimes causing curing defects, which are generally called "amine cracks".

The present applicant has previously proposed a method for producing fluororubber vulcanization-molded products suitably used as grommets, seal packing, etc., for sensors operable in high-temperature environments, using general-purpose fluororubber, wherein a fluororubber composition comprising a fluororubber, calcium hydroxide, magnesium oxide, and thermal black and a bituminous coal filler is subjected to vulcanization-molding in the presence of a polyol-based vulcanizing agent, followed by heat treatment at a temperature of about 250 to 300° C.

Fluororubber vulcanization molded products obtained by this method have excellent compression set characteristics and compression cracking resistance in high-temperature environments; however, they are polyol-vulcanizates and are therefore not in a satisfactory level in terms of water resistance and steam resistance (Patent Document 1).

PRIOR ART DOCUMENT

Patent Document

Patent Document 1 : JP-A-2001-192482
Patent Document 2 : JP-B-4539510
Patent Document 3 : JP-A-5-287150
Patent Document 4 : JP-A-10-139970
Patent Document 5 : JP-A-2004-217892

OUTLINE OF THE INVENTION

Problem to be Solved by the Invention

The present applicant has also proposed a fluororubber composition using general-purpose ternary type fluororubber and being capable of producing a vulcanizate having excellent water resistance, steam resistance, fuel oil resistance, and compression set characteristics; the fluororubber composition comprising a peroxide-crosslinkable tetrafluoroethylene-vinylidene fluoride-hexafluoropropene ternary copolymer rubber having a fluorine content of 67 to 69 wt. %, (A) carbon black having a specific surface area of 5 to 20 $m^2/g$, (B) a bituminous filler, (C) zinc oxide or hydrotalcite, and (D) an organic peroxide, and being used as a molding material for fuel oil sealing materials to be in contact with fuel oil (Patent Document 2).

Meanwhile, fluororubber has excellent heat resistance, chemical resistance, and other properties, and is therefore widely used as a sealing material for automotive fuel, etc. Recently, however, fuel containing ether or alcohol has been used in the aspects of more highly efficient automotive fuel, exhaust gas control, etc. The use of such fuel is accompanied by the problem of corrosion in metal parts, such as the inside of pipes, in contact with the fluororubber.

Fluororubber compositions compounding a metal oxide have been proposed as rubber that can prevent metal corrosion (Patent Documents 3 to 5). The evaluation method thereof confirmed corrosion-preventing effects by bringing the compositions into contact with SPCC or soft steel. However, under such severe conditions that more highly corrosion-resistant stainless steel corrodes, the above fluororubber compositions exhibit some corrosion-preventing effects, but the effects are not sufficient. Moreover, if the amount of an acid acceptor is increased to improve corrosion resistance, compression set deteriorates, and dispersion during kneading becomes insufficient.

An object of the present invention is to provide a rubber composition that comprises a peroxide-crosslinkable tetrafluoroethylene-vinylidene fluoride-hexafluoropropene ternary copolymer rubber, carbon black having a specific surface area, a bitumen filler, an organic peroxide, etc., and that has excellent metal corrosion resistance.

Means for Solving the Problem

The above object of the present invention can be achieved by a fluororubber composition comprising:
100 parts by weight of a peroxide-crosslinkable tetrafluoroethylene-vinylidene fluoride-hexafluoropropene ternary type copolymer rubber having a fluorine content of 64 wt. % or more;
(A) 5 to 90 parts by weight of carbon black having a specific surface area of 5 to 20 m2/g;
(B) 5 to 40 parts by weight of a fine bituminous powder;
(C) 1 to 30 parts by weight of hydrophilicity-imparted talc and/or 1 to 20 parts by weight of hydrophilicity-imparted clay; and
(D) 0.5 to 6 parts by weight of an organic peroxide;
the fluororubber composition being used as a molding material for fuel oil sealing materials to be in contact with fuel oil.

Effect of the Invention

The fluororubber composition of the present invention has excellent metal corrosion resistance, without compounding an acid acceptor comprising a metal oxide. Therefore, the fluororubber composition of the present invention is suitably used as a molding material for sealing materials having excellent metal corrosion resistance against metal to be in contact with various fuel oils, such as fuel oil C, ether-containing fuel oil, and alcohol-containing fuel oil.

EMBODIMENTS FOR CARRYING OUT THE INVENTION

As the general-purpose ternary type fluororubber, a ternary copolymer rubber of tetrafluoroethylene [TFE], vinylidene fluoride [VdF], and hexafluoropropene [HFP] is used. This ternary type copolymer rubber is classified into two types: peroxide-crosslinkable type and polyol-vulcanizable type. In terms of water resistance, the former type of ternary type copolymer rubber is used in the present invention. The peroxide-crosslinkable ternary type copolymer rubber can be obtained by the coexistence of a saturated or unsaturated iodine- and/or bromine-containing compound during the copolymerization reaction.

The fluorine content of the ternary type copolymer rubber must be in the range of 64 wt. % or more, preferably 67 to 69 wt. %. Generally, when the VdF content of the copolymer rubber is higher, the fluorine content tends to decrease; whereas when the TFE content of the copolymer rubber is higher, the fluorine content tends to increase. Accordingly, the ternary type copolymer rubber having the above-defined fluorine content can be formed by adjusting the copolymerization ratio of the three copolymerization components. The ternary type copolymer rubber having such a fluorine content has a copolymerization composition in which, for example, TFE is 30 to 1 mol %, preferably 20 to 10 mol %, VdF is 80 to 50 mol %, preferably 75 to 60 mol %, and HFP is 30 to 15 mol %, preferably 20 to 15 mol %. When a ternary type copolymer rubber whose fluorine content is lower than this range is used, amine resistance, water resistance, and hot water resistance are all deteriorated. Conversely, when a ternary type copolymer rubber whose fluorine content is higher than this range is used, compression set values after an air aging test are deteriorated, and low-temperature characteristics are significantly inferior. Moreover, the Mooney viscosity $ML_{1+4}$ (121° C.) thereof is preferably in the range of about 20 to 80.

To the ternary type copolymer rubber, (A) carbon black, (B) a fine bituminous powder, and (C) at least one of hydrophilicity-imparted talc and hydrophilicity-imparted clay are added as essential additives, and peroxide crosslinking with (D) an organic peroxide is performed.

Usable examples of the carbon black as the component (A) include those having a specific surface area (measured by a nitrogen adsorption specific surface area method) of 5 to 20 $m^2/g$. For example, thermal carbon black, more specifically MT carbon black (specific surface area: 6 $m^2/g$, specific gravity: 1.8, oil absorption: 0.4 $cm^3/g$, and average particle diameter: 450 nm), FT carbon black (specific surface area: 13 to 19 $m^2/g$, specific gravity: 1.8, oil absorption: 0.5 $cm^3/g$, and average particle diameter: 90 to 206 nm), etc., are used. When carbon black whose specific surface area is outside of the above range is used, crosslinking density becomes low, not only reducing compression set characteristics, but also increasing the adhesion to the mating material housing.

Usable examples of the fine bituminous powder as the component (B) generally include those having an average particle diameter of about 1 to 10 μm, preferably about 5 to 7 μm, and having a specific gravity of 1.25 to 1.45. For example, Austin Black 325 (produced by Coal Fillers; average particle diameter: 6 μm, and specific gravity: 1.32), Mineral Black 325BA (produced by Keystone Filley; average particle diameter: 6 μm, specific gravity: 1.22), etc., are used.

The carbon black as the component (A), which is used in an amount of about 5 to 90 parts by weight, preferably about 5 to 40 parts by weight, and the fine bituminous powder as the component (B), which is used in an amount of about 5 to 40 parts by weight, preferably about 5 to 35 parts by weight, based on 100 parts by weight of ternary type copolymer rubber, are used at a weight ratio of about 6 to ⅙, preferably about 3 to ⅓. When these components are used at a ratio outside of the above range, compression set and strength become worse. Moreover, both components are used in a total amount of about 10 to 100 parts by weight, preferably about 20 to 50 parts by weight, based on 100 parts by weight of ternary type copolymer rubber. When the total amount is less than this range, heat resistance is reduced, whereas when the total amount is greater than this range, hardness increases and moldability decreases, thereby reducing usefulness.

The fine bituminous powder as the component (B) is used in an amount such that the total amount of the fine bituminous powder and at least one of hydrophilicity-imparted talc and clay as the component (C), described later, is about 10 to 50 parts by weight, preferably about 10 to 40 parts by weight, based on 100 parts by weight of ternary type copolymer rubber. When the total amount of these components is less than this range, sufficient metal corrosion resistance cannot be obtained; whereas when the total amount is greater than this range, the viscosity of the fluororubber composition is excessively high, which may tend to interfere with kneading and molding.

Examples of the hydrophilicity-imparted talc as the component (C) include talc treated at a high temperature of 1,100° C. or more, and the like. Practically, Enstac 24 (produced by Asada Milling Co., Ltd.) and other commercial products are used as they are. The hydrophilicity-imparted talc is used in an amount of about 1 to 30 parts by weight, preferably about 1 to 25 parts by weight, based on 100 parts by weight of ternary type copolymer rubber.

Further, examples of the hydrophilicity-imparted clay include clay that is surface-treated with a silane-based coupling agent, preferably an unsaturated group-containing silane-based coupling agent, such as vinyltrichlorosilane, vinyltriethoxysilane, vinyltris(β-methoxyethoxy)silane, or γ-methacryloxpropyltrimethoxysilane. Practically, ST-100 (produced by Shiraishi Calcium Kaisha, Ltd.), Translink 37 (produced by Engelhard), and other commercial products are used as they are. The hydrophilicity-imparted clay is used in an amount of about 1 to 20 parts by weight, preferably about 1 to 15 parts by weight, based on 100 parts by weight of ternary type copolymer rubber.

The hydrophilicity-imparted clay as used herein refers to clay that becomes completely hydrophilic, without impairing the properties of anhydrous aluminum silicate or hydrous magnesium silicate, which is used as the base. In particular, clay surface-treated with a silane-based coupling agent completely achieves hydrophilicity in this sense.

In addition, Patent Document 2 indicates not only that an acid acceptor comprising zinc oxide or hydrotalcite is used as an essential component, but also that fillers, such as talc and clay, can be suitably used as optional components, if necessary. However, when the hydrophobic talc or clay described in Patent Document 2, to which hydrophilicity is not imparted, is used, almost no metal corrosion resistance is obtained, as shown in the results of Comparative Examples 8 to 10, described later.

As the organic peroxide as the component (D), any organic peroxide that can generally be used for peroxide crosslinking of rubber can be used without limitation. Usable examples thereof include di-tert-butyl peroxide, dicumyl peroxide, tert-butyl cumyl peroxide, 1,1-di(tert-butylperoxy)-3,3,5-trimethylcyclohexane, 2,5-dimethyl-2,5-di(tert-butylperoxy)hexane, 2,5-dimethyl-2,5-di(tert-butylperoxy)hexyne-3, 1,3-di(tert-butylperoxyisopropyl)benzene, 2,5-dimethyl-2,5-di(benzoylperoxy)hexane, tert-butylperoxy benzoate, tert-butylperoxy isopropyl carbonate, n-butyl-4,4-di(tert-butylperoxy)valerate, and the like. The organic peroxide is used in an amount of about 0.5 to 6 parts by weight, preferably about 1 to 5 parts by weight, based on 100 parts by weight of ternary type copolymer rubber. When the amount of organic peroxide used is less than this range, sufficient crosslinking density is not obtained. In contrast, when the amount is greater than this range, vulcanization molded products cannot be obtained because of blisters; even if vulcanization-molded products are obtained, their elasticity and elongation are lower.

For the peroxide crosslinking with an organic peroxide, it is preferable to use in combination a polyfunctional unsaturated compound as the component (E), such as triallyl isocyanurate, triallyl cyanurate, triallyl trimellitate, trimethylolpropane trimethacrylate, and N,N'-m-phenylene bismaleimide, in an amount of about 1 to 10 parts by weight, preferably about 2 to 8 parts by weight, based on 100 parts by weight of ternary type copolymer rubber. When the amount of polyfunctional unsaturated compound used is less than this range, sufficient crosslinking density may not be obtained. In contrast, when the amount is greater than this range, vulcanization-molded products cannot be obtained because of blisters; even if vulcanization-molded products are obtained, their elasticity and elongation are lower.

Other than the above-mentioned essential components, the rubber composition suitably contains, if necessary, reinforcing agents, such as white carbon, fillers, such as graphite and calcium silicate, processing aids, such as stearic acid, palmitic acid, and paraffin wax, antioxidants, plasticizers, and the like that are generally used as compounding agents for rubber.

The preparation of the composition is carried out by kneading the above components using a closed-type kneader (e.g., kneader, intermix, or Banbury mixer) or an open roll. The kneaded produce is extruded into a sheet-like shape, or formed into a predetermined shape using an extruder, Bauer machine, or the like. Then, the resultant is subjected to vulcanization-molding using a compression press, cast-molding machine, injection-molding machine, or the like, at about 150 to 230° C. for about 1 to 30 minutes, and is further subjected to secondary vulcanization using an air oven, or the like, at about 175 to 250° C., preferably about 200 to 230° C., for about 5 to 48 hours, preferably about 15 to 30 hours.

EXAMPLES

The following describes the present invention with reference to Examples.

Example 1

TFE/VdF/HFP ternary copolymer rubber (peroxide vulcanization type; P457, produced by Solvay Solexis; fluorine content: 67 wt. %, $ML_{1+4}(121°\ C.)$: 21): 100 parts by weight MT carbon black (N-990, produced by Cancarb; particle diameter: 500 nm): 30 parts by weight Austin black (produced by Coal Fillers; particle diameter: 6 μm): 10 parts by weight Hydrophilicity-imparted talc (Enstac 24, produced by Asada Milling Co., Ltd.; treated with special high-temperature): 5 parts by weight Triallyl isocyanurate (TAIC WH, produced by Nippon Kasei Chemical Co., Ltd.; 60%): 3 parts by weight 2,5-dimethyl-2,5-di(tert-butylperoxy)hexane (Perhexa 25B, produced by NOF Corporation; 40%): 2 parts by weight The above components were kneaded using a kneader and an open roll. The kneaded product was subjected to press vulcanization at 180° C. for 6 minutes, followed by oven vulcanization (secondary vulcanization) at 230° C. for 22 hours, thereby obtaining a vulcanized sheet of a thickness of 2.0 mm.

The vulcanized sheet was subjected to the following metal corrosion test. However, no specimen was produced in Comparative Example 3, described later.

Metal corrosion test: The vulcanized sheet was sandwiched with two metal (SUS304) sheets, and immersed in a test solution prepared by adding 10% ethanol and 500 ppm distilled water to Fuel C, at 120° C. for 7 hours. Then, the corroded state of the surface of the metal plates in contact with the vulcanized sheet was visually observed and evaluated as follows: no corrosion: ○, slight corrosion: Δ, and corrosion ×.

Example 2

In Example 1, the same amount (5 parts by weight) of hydrophilicity-imparted clay (Translink 37, produced by Engelhard; treated with a vinylsilane coupling agent) was used in place of the hydrophilicity-imparted talc.

Example 3

In Example 1, 5 parts by weight of hydrophilicity-imparted clay (Translink 37) was further used.

Comparative Example 1

In Example 1, Austin black and hydrophilicity-imparted talc were not used.

Comparative Example 2

In Example 3, the amount of Austin black was changed to 3 parts by weight, and the amounts of hydrophilicity-imparted talc and hydrophilicity-imparted clay were each changed to 0.5 parts by weight.

Comparative Example 3

In Example 3, the amounts of Austin black, hydrophilicity-imparted talc, and hydrophilicity-imparted clay were changed to 50 parts by weight, 40 parts by weight, and 30 parts by weight, respectively,

Comparative Example 4

In Comparative Example 1, 40 parts by weight of magnesium oxide (Kyowamag 140, produced by Kyowa Chemical Industry Co., Ltd.) was further added.

Comparative Example 5

In Example 1, the amount of Austin black was changed to 20 parts by weight, and hydrophilicity-imparted talc was not used.

Comparative Example 6

In Example 1, the amount of hydrophilicity-imparted talc was changed to 20 parts by weight, and Austin black was not used.

Comparative Example 7

In Example 1, 20 parts by weight of hydrophilicity-imparted clay (Translink 37) was further added, and Austin black and hydrophilicity-imparted talc were not used.

Comparative Example 8

In Example 1, the same amount (5 parts by weight) of general-purpose hydrophobic talc (MS-P, produced by Nippon Talc Co., Ltd.) was used in place of the hydrophilicity-imparted talc.

Comparative Example 9

In Example 2, the same amount (5 parts by weight) of general-purpose hydrophobic clay (Union Clay RC-1, produced by Takehara Kagaku Kogyo Co., Ltd.) was used in place of the hydrophilicity-imparted talc.

Comparative Example 10

In Comparative Example 8, 5 parts by weight of general-purpose hydrophobic clay (Union Clay RC-1) was further used.

The following table shows the metal corrosion test results obtained in the above Examples and Comparative Examples (except for Comparative Example 3), together with the composition components used (except for the common components, i.e., ternary type copolymer, carbon black, co-crosslinking agent, and organic peroxide; unit: parts by weight).

TABLE

| | Ex. | | | Comp. Ex. | | | | | | | | |
|---|---|---|---|---|---|---|---|---|---|---|---|---|
| | 1 | 2 | 3 | 1 | 2 | 4 | 5 | 6 | 7 | 8 | 9 | 10 |
| [Composition components] | | | | | | | | | | | | |
| Austin black | 10 | 10 | 10 | — | 3 | — | 20 | — | — | 10 | 10 | 10 |
| Hydrophilicity-imparted talc | 5 | — | 5 | — | 0.5 | — | — | 20 | — | — | — | — |
| Hydrophilicity-imparted clay | — | 5 | 5 | — | 0.5 | — | — | — | 20 | — | — | — |
| Magnesium oxide | — | — | — | — | — | 4 | — | — | — | — | — | — |
| General-purpose talc | — | — | — | — | — | — | — | — | — | 5 | — | 5 |
| General-purpose clay | — | — | — | — | — | — | — | — | — | — | 5 | 5 |
| [Metal corrosion test] | | | | | | | | | | | | |
| Evaluation | ○ | ○ | ○ | x | △ | △ | △ | x~△ | x~△ | x | x | x |

These results demonstrate the following:

(1) In each example, no corrosion was observed in the metal plates.

(2) In Comparative Example 1, corrosion was observed on the metal plate surface.

(3) In Comparative Example 2, the compounding amounts of Austin black, hydrophilicity-imparted talc, and hydrophilicity-imparted clay were all not greater than the defined amounts. Although some corrosion-preventing effects were obtained, slight corrosion was observed on the metal plate surface.

(4) In Comparative Example 3, the compounding amounts of Austin black, hydrophilicity-imparted talc, and hydrophilicity-imparted clay were all more than the defined amounts; therefore, workability was poor, and no test piece was produced.

(5) In Comparative Example 4, the magnesium oxide as an acid acceptor showed some effects, but slight corrosion was observed on the metal plate surface.

(6) In Comparative Examples 5 to 7, Austin black, hydrophilicity-imparted talc, and hydrophilicity-imparted clay were not used in combination, but were used singly. In these cases, slight corrosion was observed on the metal plate surface.

(7) In Comparative Examples 8 to 10, general-purpose talc, general-purpose clay, or both were used, and corrosion was observed on the metal plate surface.

These facts demonstrate that no corrosion-preventing effects can be obtained by compounding a fine bituminous powder with general-purpose talc and general-purpose clay; some corrosion-preventing effects are obtained by singly using a fine bituminous powder, hydrophilicity-imparted talc, or hydrophilicity-imparted clay, but are not sufficient; and a fluororubber composition having excellent metal corrosion resistance can be only obtained by using a fine bituminous powder in combination with at least one of hydrophilicity-imparted talc and hydrophilicity-imparted clay.

The invention claimed is:

1. A fluororubber composition comprising:
   100 parts by weight of a peroxide-crosslinkable tetrafluoroethylene-vinylidene fluoride-hexafluoropropene ternary copolymer rubber comprising 1 to 30 mol % tetrafluoroethylene, 50 to 80 mol % vinylidene fluoride and 15 to 30 mol % hexafluoropropene and having a fluorine content of 64 wt. % or more;
   (A) 5 to 90 parts by weight of carbon black having a specific surface area of 5 to 20 $m^2/g$;

(B) 5 to 40 parts by weight of a fine bituminous powder;
(C) 1 to 20 parts by weight of hydrophilicity-imparted clay; and
(D) 0.5 to 6 parts by weight of an organic peroxide;
wherein the total amount of the (B) fine bituminous powder and the clay is 10 to 50 parts by weight based on 100 parts by weight of ternary copolymer rubber, the fluororubber composition being free from an acid acceptor comprising a metal oxide and hydrotalcite and used as a molding material for fuel oil sealing materials to be in contact with fuel oil.

2. The fluororubber composition according to claim 1, wherein the peroxide-crosslinkable ternary copolymer rubber has a fluorine content of 67 to 69 wt. %.

3. The fluororubber composition according to claim 1, wherein the carbon black is MT carbon black or FT carbon black.

4. The fluororubber composition according to claim 1, wherein the fine bituminous powder is Austin black.

5. The fluororubber composition according to claim 1, wherein the clay is imparted with hydrophilicity by surface treatment with a silane coupling agent.

6. The fluororubber composition according to claim 1, wherein the weight ratio of carbon black as the component (A) and fine bituminous powder as the component (B) is 6 to 1/6, and the total amount of the component (A) and the component (B) is 10 to 100 parts by weight based on 100 parts by weight of ternary copolymer rubber.

7. The fluororubber composition according to claim 1, wherein 1 to 10 parts by weight of (E) a polyfunctional unsaturated compound is further used in combination with the (D) organic peroxide.

8. A fuel oil sealing material to be in contact with fuel oil, the sealing material being obtained by crosslinking molding of the fluororubber composition according to claim 1.

9. A fuel oil sealing material to be in contact with fuel oil, the sealing material being obtained by crosslinking molding of the fluororubber composition according to claim 7.

* * * * *